United States Patent [19]

Monma et al.

[11] 4,233,413
[45] Nov. 11, 1980

[54] RESIN COMPOSITION WITH LOW SHRINKAGE

[75] Inventors: Noboru Monma; Iwao Maekawa, both of Hitachi; Tutomu Sarudate, Juomachi; Hidetaka Sato; Isao Uchigasaki, both of Hitachi, all of Japan

[73] Assignee: Hitachi Chemical Company, Ltd., Japan

[21] Appl. No.: 964,169

[22] Filed: Nov. 28, 1978

[30] Foreign Application Priority Data

Nov. 29, 1977 [JP] Japan ............................ 52-143064

[51] Int. Cl.² ............................................ C08L 67/06
[52] U.S. Cl. ................................ 525/168; 260/40 R; 525/40; 525/42; 525/43; 525/49; 525/177; 525/27; 525/36

[58] Field of Search ............... 260/862, 871, 872, 873, 260/40 R; 525/27, 36, 40, 43, 49, 168, 177

[56] References Cited

U.S. PATENT DOCUMENTS

| | | | |
|---|---|---|---|
| 3,503,921 | 3/1970 | Souza, Jr. et al. | 260/862 |
| 3,883,612 | 5/1975 | Pratt et al. | 260/862 |
| 4,052,358 | 10/1977 | Wada et al. | 260/862 |

*Primary Examiner*—J. Ziegler
*Attorney, Agent, or Firm*—Craig & Antonelli

[57] ABSTRACT

A resin composition comprising (A) 25 to 45 parts by weight of an unsaturated polyester having special structure, (B) 40 to 60 parts by weight of polymerizable monomer such as styrene, and (C) 4.5 to 15 parts by weight of a polystyrene, has low shrink properties and excellent electrical properties when molded, particularly by casting.

11 Claims, No Drawings

RESIN COMPOSITION WITH LOW SHRINKAGE

This invention relates to a resin composition having low shrink properties and being low in viscosity and excellent in electrical properties, particularly insulation resistance at high temperatures.

Unsaturated polyester resins, epoxy resins, polyurethane resins, modified acrylic resins, and the like have been known and used widely commercially as decorative materials for furnitures, garments, adhesives, structural materials, electrical insulating materials, elastic materials, and the like by putting their features to practical use.

Particularly in the case of unsaturated polyester resins, since they are cheaper than epoxy resins, and have low viscosity without lowering their fluidity even if a large amount of filler is mixed therewith, they have many advantages in (1) lowering of the cost, (2) lowering of internal heat build-up, (3) lowering of volume shrinkage, (4) increase of heat conductivity, etc. Further since the curing agents used therein show no toxicity, curing at high temperatures with heating is not necessary, and molded articles are excellent in mechanical properties, electrical properties, and hot water resistance, they are used in large amounts for producing resin concrete, artificial marble, various electrical parts, etc.

But, since the unsaturated polyester resin has an intrinsic defect in that shrinkage at curing is great, when a molded article has an outer container or an insert therein, there arise interfacial peeling of the unsaturated polyester resin, cracks, lowering in surface appearance, lowering in mechanical and electrical properties, etc., which results in lowering in commercial value and preventing the spread of usage. Particularly, interfacial peeling and internal fissure are fatal defects for electrical parts produced by casting.

In order to remove these defects, there has been tried to modify an unsaturated polyester resin with a petroleum resin, epoxy resin, xylene-formaldehyde resin, alkyd resin, etc. The modification of the unsaturated polyester resin may improve adhesion to the container and the generation of internal cracks, but there arise another defects such as poor in heat resistance, electrical properties, etc. These defects provide problems when used as electrical insulating materials and limit applications of the resin.

On the other hand, there has been proposed a process of mixing a thermoplastic polymeric material with an unsaturated polyester resin. In general, compatibility of the unsaturated polyester resin with the thermoplastic polymeric material is poor, so that the thermoplastic polymeric material separated is raised on the surface and spoil surface appearance remarkably or there arise peeling and cracks at the bottom, which results in incomplete molded articles and provides a problem in practical production.

It is an object of the present invention to provide a resin composition which overcomes the defects mentioned above. It is another object of the present invention to provide a resin composition being excellent in fluidity, curing and workability also in the case of producing cast articles, showing no peeling of the container or generation of cracks, and being excellent in electrical properties, particularly insulation resistance at high temperatures, and in low shrink properties.

The present invention provides a resin composition having low shrink properties which comprises
(A) 25 to 45 parts by weight of an unsaturated polyester containing tricyclo[5,2,1,0$^{2,6}$]dec-4-el-8 or 9-yl groups, alpha, beta-unsaturated dibasic acid residues, and glycol residues as structural units,
(B) 40 to 60 parts by weight of one or more polymerizable monomers having one or more polymerizable double bonds in the molecule, and
(C) 4.5 to 15 parts by weight of a polystyrene.

According to the present invention, the resin composition is excellent in fluidity, curing and workability, showing no peeling of the container and no generation of cracks, and excellent in electrical properties, and thus it is suitable for use in casting, and the like.

The unsaturated polyester, the component (A), can be obtained by reacting dicyclopentadiene with an alpha, beta-unsaturated dibasic acid or reacting dicyclopentadiene with an alpha, beta-unsaturated dibasic acid anhydride and water at 150° C. or lower to yield a partially esterified dicylcopentadiene carboxylic acid, which is further reacted with at least one polyhydric alcohol such as a glycol.

Examples of alpha, beta-unsaturated dibasic acids or anhydride thereof are maleic acid, fumaric acid, itaconic acid, citraconic acid, etc., and their anhydrides such as maleic anhydride, etc.

Examples of glycols are ethylene glycol, diethylene glycol, propylene glycol, dipropylene glycol, 1,3- or 1,4-butanediol, 1,3-butylene glycol, 1,6-hexanediol, neopentyl glycol, ethylene oxide or propylene oxide adduct of bisphenol, etc.

More in detail, in the case of using maleic anhydride as the alpha, beta-unsaturated dibasic acid, the unsaturated polyester (A) can be obtained by reacting in the first step dicyclopentadiene, maleic anhydride and water at 150° C. or lower (an addition reaction), and reacting in the second step the resulting addition reaction product with at least one polyhydric alcohol (esterification reaction). In the first step reaction, maleic anhydride is reacted with water to give maleic acid, which is further reacted with dicyclopentadiene in the absence of a catalyst due to strong dissociation property of maleic acid to bring about an addition reaction of maleic acid with dicyclopentadiene as follows:

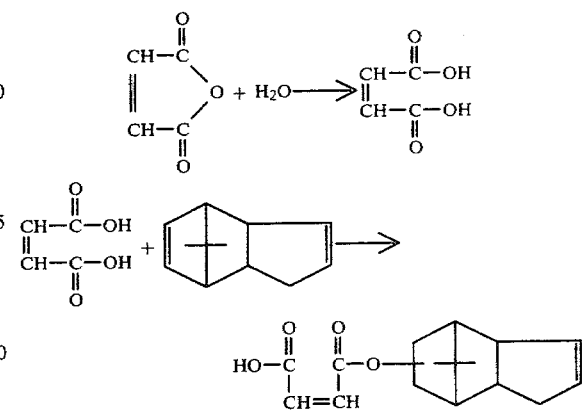

The partially esterified dicyclopentadiene carboxylic acid can be obtained by reacting dicyclopentadiene with maleic anhydride preferably in equimolar amounts, and using water preferably in a litte excess with respect to maleic anhydride. When the reaction temperature is higher than 150° C., dicyclopentadiene is pyrolyzed to cyclopentadiene, which is bonded to the carbon-carbon double bond of maleic acid to reduce degree of unsaturation of the unsaturated polyester and to give bad influence on curing property and electrical properties. On the other hand, a part of maleic acid is rearranged into fumaric acid over its melting point. Since an addition reaction of fumaric acid with dicyclopentadiene in the absence of a catalyst hardly takes place, it is preferable to carry out the reaction at 140° C. or lower in order to prevent the formation of fumaric acid.

The addition reaction produce from dicyclopentadiene, maleic anhydride and water can be treated as a raw material for producing a polyester in the same manner as a monovalent unsaturated carboxylic acid. The addition reaction product is further reacted with at least one polyhydric alcohol such as a glycol as mentioned above at 150°–210° C. to yield an unsaturated polyester, the component (A). Among various glycols, propylene glycol is more preferable in order to give a resin composition having good solubility with a polystyrene without separating the latter.

An unsaturated polyester resin obtained by dissolving the thus obtained unsaturated polyester (A) in a polymerizable monomer having one or more vinyl groups such as styrene has a lower viscosity and can show better properties in adhesion and electrical properties than conventional polyester resins, but its adhesion is still insufficient. By mixing a polystyrene with the above-mentioned monomer dissolving the polyester (A), the resin composition having low shrink properties and excellent compartibility with a polystyrene comparing with the conventional unsaturated polyester resins can be obtained.

As the component (B), one or more polymerizable monomers having one or more polymerizable double bonds in the molecule are used. Examples of these monomers are those usually used in producing unsaturated polyester resins such as styrene, vinyltoluene, divinylbenzene, diallyl phthalate, chlorostyrene, etc. and other polymerizable monomers which can dissolve polystyrene used as the component (C), for example, those of acrylate or methacrylate series such as methyl acrylate, methyl methacrylate, etc.

The component (A), unsaturated polyester, is used in an amount of 25 to 45 parts by weight, preferably 35 to 40 parts by weight, in order to maintain good low shrink properties.

The component (B) such as styrene, should be contained in the resin composition in an amount of 40 to 60 parts by weight. If the amount of the polymerizable monomer such as styrene is outside the above-mentioned range, the objects of the present invention cannot be attained.

As the component (C), a polystyrene, one having an average molecular weight of 50,000–300,000 is preferable from the viewpoints of compatibility with the other components and adhesion and a viscosity of the resin composition. The component (C) is used in an amount of 4.5 to 15 parts by weight. If the amount is outside the above-mentioned range, the resulting resin composition is poor in adhesion, has an increased viscosity, or expands remarkably at curing with occasional deformation of the container used. It is preferable to use the component (C) in an amount of 6 to 9 parts by weight from the viewpoints of the viscosity of the resin composition, the compatibility and the adhesion.

A mixing method of the three components (A), (B) and (C) is not particularly limited in the present invention; e.g. after dissolving the polyester (A) in styrene (B), a styrene solution previously dissolving the polystyrene (C) can be added thereto; or the polyester (A) can be dissolved in a solution of styrene (B) and the polystyrene (C); or the like.

The resin composition of the present invention may further contain, if necessary, one or more curing catalysts, curing accelerators, polymerization inhibitors, fillers, reinforcing materials, and the like.

As the curing catalysts, any conventional ones for unsaturated polyester resins can be used. Examples of them are methyl ethyl ketone peroxide, benzoyl peroxide, cyclohexanone peroxide, cumene hydroperoxide, dicumyl peroxide, t-butyl perbenzoate, and the like.

As the curing accelerators, there can be used any substances which can decompose a catalyst by, for example, a redox reaction to generate easily active radicals. Examples of them are cobalt naphthenate, cobalt octoate, cobalt acetylacetonate, dimethylaniline, and the like.

As the polymerization inhibitors, there can be used hydroquinone, para-benzoquinone, catechol, diphenylquinone, and the like.

As the fillers, there can be used calcium carbonate, clay, alumina hydrate, silica sand, silica powder, river sand, Kansui-seki (crystalline limestone), pebbles, lightweight blowing agents, glass powder, mica powder, and the like. Particle sizes of these fillers can be selected freely, and any combinations of different particle sizes or any combinations of different kinds of fillers can be employed, if desired.

As the reinforcing materials, there can be used fibers such as glass fiber, poly(vinyl alcohol) fiber, carbon fiber, steel fiber, etc., processed fibers such as bundling of individual fibers in the form of roving, short fibers, fabrics, knitted fibers, yarn, and the like.

The resin composition of the present invention may further contain a thickener such as magnesium oxide, magnesium hydroxide, etc., a plasticizer, a lubricant, a releasing agent, colorants such as pigments and dyes, these materials being well known in the art.

The resin composition of the present invention is particularly suitable for casting.

The present invention is illustrated by the following examples, in which all parts are by weight.

EXAMPLE 1

Dicyclopentadiene (1188 parts), 883 parts of maleic anhydride, and 210 parts of water were reacted at 140° C. for 2 hours in a nitrogen stream to yield dicyclopentadienyl monomaleate, to which 411 parts of propylene glycol was added. The dehydration condensation reaction was carried out at 150°–210° C. according to a conventional method. The resulting resin (2400 parts) was dissolved in 2400 parts of styrene monomer containing 0.02% by weight of hydroquinone. The resulting solution was added to 2060 parts of a styrene solution dissolving 30% by weight of a polystyrene having a molecular weight of 150,000–200,000 (trade mark QP-2, manufactured by Denki Kagaku Kogyo K.K.) to give a uniform mixture of resin composition A.

EXAMPLE 2

Dicyclopentadienyl monomaleate was synthesized in the same manner as described in Example 1. To 2232 parts of dicyclopentadienyl monomaleate, 191 parts of diethylene glycol and 274 parts of propylene glycol were added and the dehydration condensation reaction was carried out at 150°-210° C. according to a conventional method. The resulting resin (2400 parts) was dissolved in 2400 parts of styrene monomer containing 0.02% by weight of hydroquinone. The resulting solution was added to 1600 parts by the same styrene solution containing 30% by weight of polystyrene as used in Example 1 to give a uniform mixture of resin composition B.

EXAMPLE 3

Dicyclopentadiene (792 parts), 589 parts of maleic anhydride and 140 parts of water were reacted at 125°-130° C. for 4 hours in a nitrogen stream to yield dicyclopentadienyl monomaleate. To dicyclopentadienyl monomaleate, 137 parts of propylene glycol and 241 parts of dipropylene glycol were added and the dehydration condensation reaction was carried out at 150°-210° C. according to a conventional method. The resulting resin (1500 parts) was dissolved in 1600 parts of styrene monomer containing 0.02% by weight of hydroquinone. The resulting solution was added to 1035 parts of the same styrene solution containing 30% by weight of polystyrene as used in Example 1 to give a uniform mixture of resin composition C.

COMPARATIVE EXAMPLE

A dehydration condensation reaction of 609 parts of propylene glycol, 402 parts of dipropylene glycol, 392 parts of maleic anhydride, and 888 parts of phthalic anhydride was carried out at 150°-210° C. for 8 hours in a nitrogen stream. Subsequently 2000 parts of the resulting resin was dissolved in 2000 parts of styrene monomer containing 0.02% by weight of hydroquinone to give a resin composition D.

To 100 parts of individual resin compositions A to D obtained in Examples 1 to 3 and Comparative Example, 0.5 part of 6% cobalt octoate and 1.0 part of methyl ethyl ketone peroxide were added and mixed. Individual mixtures were casted in each mold to produce resin plates of 2 mm thick and cured at 25° C. for 2 hours and at 100° C. for 2 hours. The cured articles were used for measuring volume resistivity according to JIS K 6911 with the results as shown in Table 1.

In the next place, to 100 parts of individual resin compositions A to D obtained in Examples 1 to 3 and Comparative Example, 0.5 part of 6% cobalt octoate and 1.0 part of methyl ethyl ketone peroxide were added, and individual resin compositions were kneaded in a sigma-blade mixer with 280 parts of #5 silica sand and 70 parts of calcium carbonate to give individual uniform viscous mixtures for a minimum period necessiated. Each mixture was casted in a outer container of 5 cm long, 7 cm wide and 15 cm high made of iron having an iron insert (3 cm long, 5 cm wide and 10 cm high) set therein, and allowed to stand for 24 hours at 25° C. to give a cast article. Adhesion to the outer container, and generation of cracks were observed by the naked eye with the results as shown in Table 2. The cast article was subjected to a heating and cooling test repeating a cycle of heating at 120° C. for 2 hours and cooling at 0° C. for 2 hours and observed by the naked eye as mentioned above. The results are also shown in Table 2.

TABLE 1

| Example | | Example 1 | Example 2 | Example 3 | Comparative Example |
|---|---|---|---|---|---|
| Volume resistivity ($\Omega$-cm) | 25° C. | $>10^{15}$ | $>10^{15}$ | $>10^{15}$ | $>10^{15}$ |
| | 120° C. | $3 \times 10^{15}$ | $2 \times 10^{14}$ | $1 \times 10^{15}$ | $2 \times 10^{12}$ |

TABLE 2

| Resin composition | A | B | C | D |
|---|---|---|---|---|
| Under normal conditions | | | | |
| Adhesion | Complete adhesion | Complete adhesion | Complete adhesion | Remarkable peeling |
| Cracks | None | None | None | None |
| Heating and cooling test | | | | |
| Adhesion | Complete adhesion | Complete adhesion | Complete adhesion | Remarkable peeling |
| Cracks | No crack after 10 cycles | No crack after 10 cycles | No crack after 10 cycles | Cracked after 2 cycles |

The above results clearly show that the resin composition of the present invention has the following advantages: (1) adhesion to an outer container is complete and no crack is generated in the case of cast articles, (2) cast articles are excellent in resistance to cycles of heating and cooling, (3) cast articles are excellent in insulation resistance, (4) as combined effects of (1) to (3) mentioned above, cast articles are excellent in electrical insulating properties when used in electrical parts, and the like.

What is claimed is:

1. A resin composition having low shrink properties which comprises
   (A) 25 to 45 parts by weight of an unsaturated polyester containing tricyclo(5,2,1,0$^{2,6}$)dec-4-el-8 or 9-yl groups, alpha, beta-unsaturated dibasic acid residues, and glycol residues as structural units, said unsaturated polyester being obtained by reacting, in equimolar amounts, dicyclopentadiene with an alpha, beta-unsaturated dibasic acid or by reacting, in equimolar amounts, dicyclopentadiene with an alpha, beta-unsaturated dibasic acid anhydride and water at 150° C. or lower to yield a partially esterified dicyclopentadienecarboxylic acid, which is further reacted with at least one polyhydric alcohol.
   (B) to 40 to 60 parts by weight of one or more polymerizable monomoers having one or more polymerizable double bonds in the molecule, and
   (C) 4.5 to 15 parts by weight of a polystyrene.

2. A resin composition according to claim 1, wherein the alpha, beta-unsaturated dibasic acid or anhydride thereof is selected from the group consisting of maleic anhydride, maleic acid, fumaric acid, itaconic acid, and citraconic acid.

3. A resin composition according to claim 2, wherein the polyhydric alcohol is selected from the group consisting of ethylene glycol, propylene glycol, diethylene glycol, dipropylene glycol, and 1,3-butylene glycol, 1,3- or 1,4-butanediol, 1,6-hexanediol, neopentyl glycol and ethylene oxide or propylene oxide adduct of bisphenol.

4. A resin composition according to claim 3, wherein the polymerizable monomer is selected from the group consisting of styrene, vinyltoluene, divinylbenzene, diallyl phthalate, chlorostyrene, methyl acrylate, and methyl methacrylate.

5. A resin composition according to claim 1, wherein the polyhydric alcohol is propylene glycol.

6. A resin composition according to claim 1, wherein the alpha, beta-unsaturated dibasic acid anhydride is maleic anhydride.

7. A resin composition according to claim 1, wherein the polystyrene has a molecular weight of 50,000 to 300,000.

8. A resin composition according to claim 1 wherein the polymerizable monomer is styrene.

9. A composition according to claim 1, wherein said resin composition consists of component (A), component (B) and component (C).

10. A composition according to claim 1, wherein said composition contains a curable resin component, and at least one of a filler, a colorant, a curing catalyst, and a reinforcing material, said resin component consisting of (A), (B) and (C)..

11. A cured resin composition consisting essentially of the cured product of the resin composition of claim 1 and an organic peroxide-containing curing catalyst.

* * * * *